(12) United States Patent
Haase

(10) Patent No.: US 7,957,895 B2
(45) Date of Patent: Jun. 7, 2011

(54) NAVIGATION DEVICE AND METHOD

(75) Inventor: Eric Haase, The Hague (NL)

(73) Assignee: Tomtom International B.V., Amsterdam (NL)

( * ) Notice: Subject to any disclaimer, the term of this patent is extended or adjusted under 35 U.S.C. 154(b) by 616 days.

(21) Appl. No.: 12/007,129

(22) Filed: Jan. 7, 2008

(65) Prior Publication Data

US 2009/0177386 A1  Jul. 9, 2009

(51) Int. Cl.
*G01C 21/34* (2006.01)
*G06F 3/16* (2006.01)

(52) U.S. Cl. ........ 701/209; 701/208; 701/211; 701/213; 707/999.102; 340/988; 340/990

(58) Field of Classification Search ............... 701/209
See application file for complete search history.

(56) References Cited

U.S. PATENT DOCUMENTS

| | | | |
|---|---|---|---|
| 5,731,997 A * | 3/1998 | Manson et al. | 702/150 |
| 6,253,151 B1 * | 6/2001 | Ohler et al. | 701/208 |
| 7,373,244 B2 * | 5/2008 | Kreft | 701/207 |
| 2005/0278371 A1 * | 12/2005 | Funk et al. | 707/102 |
| 2006/0229807 A1 * | 10/2006 | Sheha et al. | 701/209 |
| 2007/0282536 A1 * | 12/2007 | Yamakawa et al. | 702/19 |
| 2008/0132252 A1 * | 6/2008 | Altman et al. | 455/457 |

FOREIGN PATENT DOCUMENTS

EP  1167924 A2 *  1/2002

\* cited by examiner

*Primary Examiner* — Thomas G Black
*Assistant Examiner* — Lin B Olsen
(74) *Attorney, Agent, or Firm* — Jacob Eisenberg

(57) ABSTRACT

A method of operating a portable navigation device or navigation system is described, together, with a computer program and a PND and navigation system. The method includes the steps of providing for a specific premises, location or location range, being identifiable with reference to map data locally stored in the device or system and optionally being or including the current location, can be at least temporarily stored in memory. The method also includes the presenting to the user at least one user-selectable option by means of which qualitative information pertaining to the premises, location or range can be entered locally in the device or system, the selection of the option resulting in the immediate or subsequent recordal and storage of both the qualitative information and an association thereof with the identified premises, location or range.

14 Claims, 10 Drawing Sheets

531

534

538

NAVIGATION DEVICE AND METHOD

BACKGROUND OF THE INVENTION

Portable navigation devices (PNDs) including GPS (Global Positioning System) signal reception and processing means are well known and are widely employed as in-car navigation systems. In essence, modern PNDs comprise:
- a processor,
- memory (at least one of volatile and non-volatile, and commonly both),
- map data stored within said memory,
- a software operating system and optionally one or more additional programs executing thereon, to control the functionality of the device and provide various features,
- a GPS antenna by which satellite-broadcast signals including location data can be received and subsequently processed to determine a current location of the device,
- optionally, electronic gyroscopes and accelerometers which produce signals capable of being processed to determine the current angular and linear acceleration, and in turn, and in conjunction with location information derived from the GPS signal, velocity and relative displacement of the device and thus the vehicle in which it is mounted,
- input and output means, examples including a visual display (which may be touch sensitive to allow for user input), one or more physical buttons to control on/off operation or other features of the device, a speaker for audible output,
- optionally one or more physical connectors by means of which power and optionally one or more data signals can be transmitted to and received from the device, and
- optionally one or more wireless transmitters/receivers to allow communication over mobile telecommunications and other signal and data networks, for example Wi-Fi, Wi-Max GSM and the like.

The utility of the PND is manifested primarily in its ability to determine a route between a start or current location and a destination, which can be input by a user of the computing device, by any of a wide variety of different methods, for example by postcode, street name and number, and previously stored well known, favourite or recently visited destinations. Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice. In addition, the device may continually monitor road and traffic conditions, and offer to or choose to change the route over which the remainder of the journey is to be made due to changed conditions. Real time traffic monitoring systems, based on various technologies (e.g. mobile phone calls, fixed cameras, GPS fleet tracking) are being used to identify traffic delays and to feed the information into notification systems.

The navigation device may typically be mounted on the dashboard of a vehicle, but may also be formed as part of an on-board computer of the vehicle or car radio. The navigation device may also be (part of) a hand-held system, such as a PDA (Personal Navigation Device) a media player, a mobile phone or the like, and in these cases, the normal functionality of the hand-held system is extended by means of the installation of software on the device to perform both route calculation and navigation along a calculated route. In any event, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function provided, and the navigation along such a route is another primary function. During navigation along a calculated route, the PND provides visual and/or audible instructions to guide the user along a chosen route to the end of that route, that is the desired destination. It is usual for PNDs to display map information on-screen during the navigation, such information regularly being updated on-screen so that the map information displayed is representative of the current location of the device, and thus of the user or user's vehicle if the device is being used for in-car navigation. An icon displayed on-screen typically denotes the current device location, and is centered with the map information of current and surrounding roads and other map features being also displayed. Additionally, navigation information may be displayed, optionally in a status bar above, below or to one side of the displayed map information, examples of navigation information including the distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that
- a user deviates from the previously calculated route during navigation therealong,
- real-time traffic conditions dictate that an alternative route would be more expedient and the device is suitably enabled to recognize such conditions automatically, or
- if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

More modern PNDs are being provided not only with the essential GPS antenna capable of receiving satellite signals, but also with a secondary mobile telecommunications antenna which effectively enables the device to become part of a mobile telecommunications network. Typically, the device may additionally be provided with an integrated or removable subscriber identity module (SIM) card on which are provided various data which are required to identify the device to the network and to encode and decode signals appropriate to that network to allow communication thereover.

It is also now known to provide PNDs and navigation systems with a further short-range wireless communication means, such as a Bluetooth® or Wi-Fi antenna which facilitates the pairing of the device with a similarly enabled other device, most commonly a mobile telecommunications handset.

Both of these technologies effectively permit a previously passive device, that is one which merely provides in-car navigation and route guidance functions based on the continuous and repeated determination of the current position of the device from the received GPS signals, to become an active device which is capable of transmitting information via a wider telecommunications network back to a centralized data processing service.

In this regard, U.S. Pat. No. 6,253,151 describes a feature whereby an end user of a navigation system that uses geographic data can easily report perceived errors or inaccuracies in the geographic data or other problems such as poor quality route calculation or guidance wirelessly. The end user uses a user interface of the navigation system to indicate the perceived error, inaccuracy, or other problem. The navigation system includes a report program that operates in response to the end user's indication. The report program collects information indicating the error, inaccuracy, or other problem and sends a report including the collected information to a geographic database developer. The geographic database developer can use the information in the report to update a geographic database.

The above system however is more concerned with ensuring that a centralized geographical or map database of a map data provider is as current and accurate as possible, as opposed to the provision of non-map related data, for example transient phenomena such as road works, temporary diversions and road closures, traffic congestion, accidents and other transient incidents or events which affect traffic flow and movement but do not ultimately represent a defect in the underlying map data.

The present applicant has realized that the facility for transmitting locally entered information specific to a location or range of locations offers a far greater spectrum of possibilities than mere map data correction and enhancement, especially when this information is made available by subsequent retransmission to the wider installed user base of devices and systems.

Accordingly, it is an object of the present invention to provide a PND or navigation system, a method of operating such, and a computer program by means of which such are controlled, which provides an enhanced facility for reporting, among other things, transient phenomena and user-specific and/or local information, being that which is entered locally at the device or system.

BRIEF SUMMARY OF THE INVENTION

According to the present invention there is provided a method of operating a PND or navigation system, said method including the steps of providing a means by which a specific premises, location or location range, being identifiable with reference to map data locally stored in the device or system and optionally being or including the current location, can be at least temporarily stored in memory, and characterized in that the method includes the further steps of presenting to the user at least one user-selectable option by means of which qualitative information pertaining to the said premises, location or range can be entered locally in the device or system, the selection of said option resulting in the recordal and storage of both the qualitative information and an association thereof with the identified premises, location or range, such being primary information, and further characterized in that the primary information is subsequently transmitted to a remote device.

Preferably, the primary information is subsequently transmitted wirelessly, and most preferably within only a few minutes of being created, although this invention encompasses the embodiment where the user of the device or system is afforded the opportunity of associating qualitative information with a particular premises, location or range, and storing the primary information in the device or system for later transmission to a remote device by means of a physical connection, for example to a remote PC or appropriate or suitable device by means of a USB or other cable type which connects the device or system to said PC or appropriate or suitable device.

Preferably the qualitative information enterable by the user includes at least some indication of the user's subjective opinion of the premises, location or range of locations. Most preferably the qualitative information includes some form of user rating based on a predetermined, locally stored scale. In a preferred embodiment, the scale extends over a predetermined number of integers and optionally zero, for example from 0-5 including 1, 2, 3, and 4.

Most preferably the qualitative information may additionally include at least one of alphanumeric and digitized audio data, the former being capable of being entered by the user through a touch sensitive screen of the device, and the latter being recorded through microphone means provided as part of the device or system.

In a most preferred embodiment, when the primary information consists of a rating indication associated with a particular premises, location or location range, the method includes the further step of presenting a further option to the user to record secondary descriptive information being both at least temporarily associated with and stored with one of the premises, location or range and the primary information, and subsequently transmitted wirelessly to a remote device.

In a preferred arrangement, the method includes the step of presenting an option to enter an audio recording mode, selection of which causes the device or system to activate the microphone and immediately commence the digitization of the audio signals received therefrom, such being streamingly stored in a digital audio file.

Most preferably, the association of the digital audio file with at least one of the primary information and the premises, location or range forming part thereof occurs either before, during or after completion of the recording procedure.

In a preferred arrangement, the method includes the step of presenting an option which causes the device or system to enter an alphanumeric character entry mode in which a virtual keyboard is displayed on a display screen of said device or system, and a text file is simultaneously or subsequently created in memory which captures the alphanumeric characters entered by the user through the virtual keyboard displayed.

Most preferably, the association of the text file with at least one of the primary information and the premises, location or range forming part thereof occurs either on, during or after creation of said text file.

In a preferred embodiment, the qualitative information includes any subjective information which the user may choose to record, such as relative enjoyment, excitement or disenchantment, or the benefit or detriment experienced by the user on visiting or travelling to or through a particular location. For example a user may wish to share his experiences of a particular route (most appropriate to walking or cycling users of portable devices), or whether a particular restaurant, theme park, or other POI was enjoyable or not, and the reasons for such enjoyment. The invention provides this facility in a simple, quick and substantially effortless manner.

In further aspects of the invention, a computer program, embodied on computer readable media as required, is provided for implementing the methods described above, as is a PND and/or navigation system adapted to perform the methods described.

In an alternative aspect, the PND or navigation system may not be provided with a mobile telecommunications antenna, such being provided by a local mobile telephone or other device capable of communicating over a mobile telecommunications network. In this aspect, the PND or navigation system may be provided with a short-range wireless antenna by means of which a communication is established with the local mobile device such that the primary and secondary information is firstly transmitted to the local mobile device for subsequent transmission over the wireless telecommunications network thereby.

In a yet further aspect of the invention, the PND or navigation system is capable of creating and displaying a hierarchy or graded list of POIs, premises, locations, or location ranges, based on rating values having been previously associated with said premises, locations or ranges, for selection by the user as a desired destination to which the PND or system subsequently performs navigation.

As will be appreciated from the above, the invention provides a means for real-time or quasi-real-time reporting of qualitative information of a type which might usefully be shared among an installed user base of devices. For example, the qualitative information may be transmitted to a remote device or system for collation, validation, and subsequent return delivery to other appropriately enabled devices, most preferably by means of a wireless telecommunications network.

BRIEF DESCRIPTION OF THE SEVERAL VIEWS OF THE INVENTION

The present application will be described in more detail below by using example embodiments, which will be explained with the aid of the drawings, in which.

Figure 5:
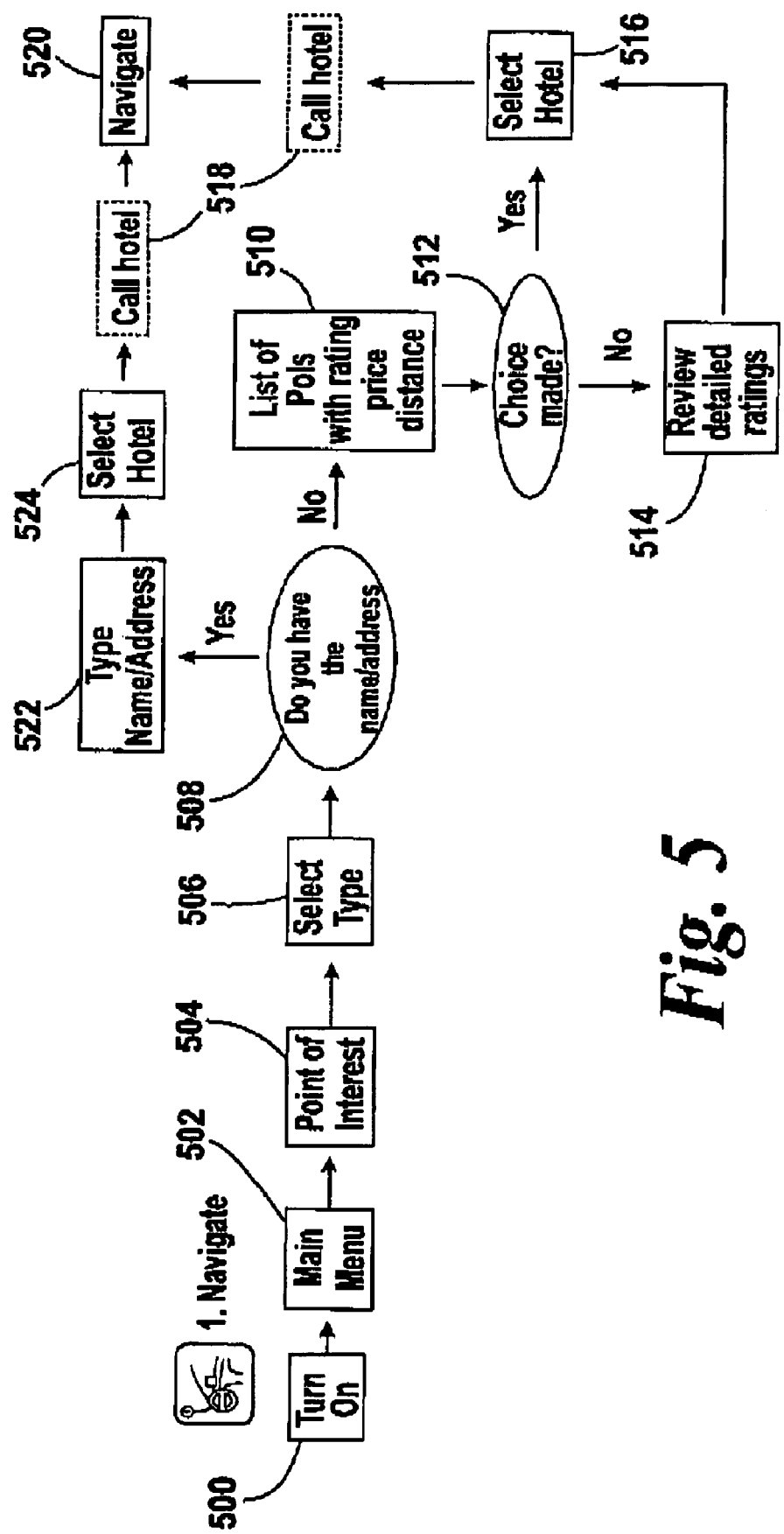
Figure 6:
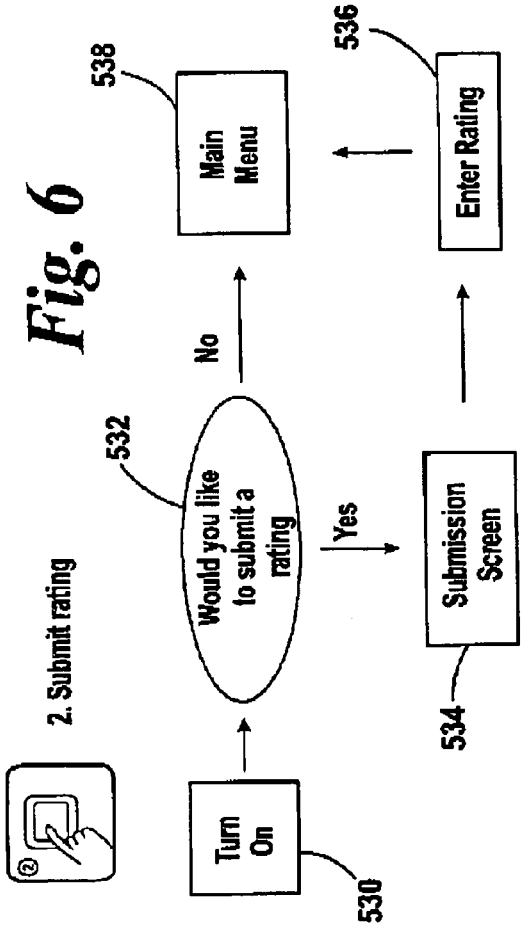
Figure 7:
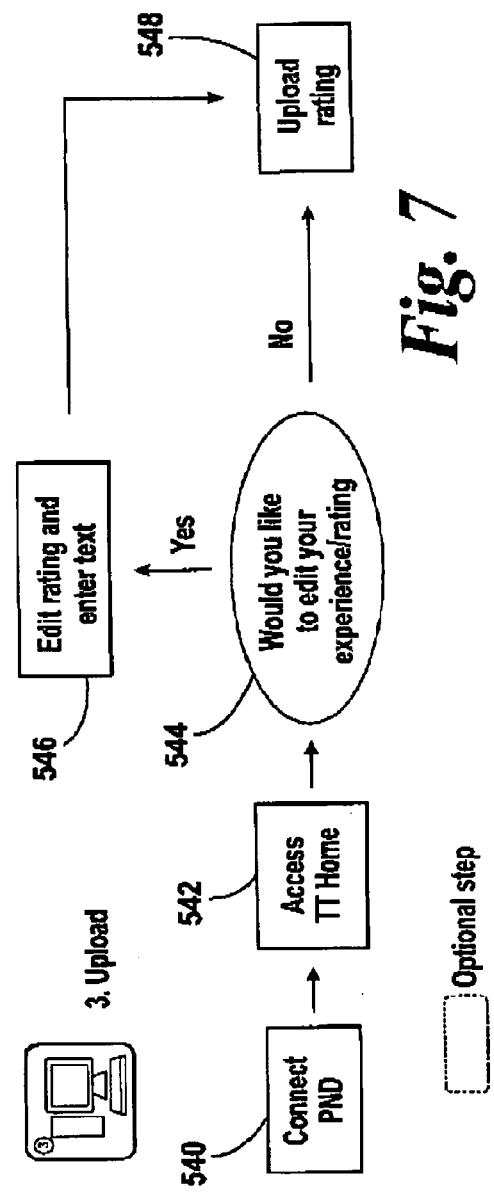
Figure 8:
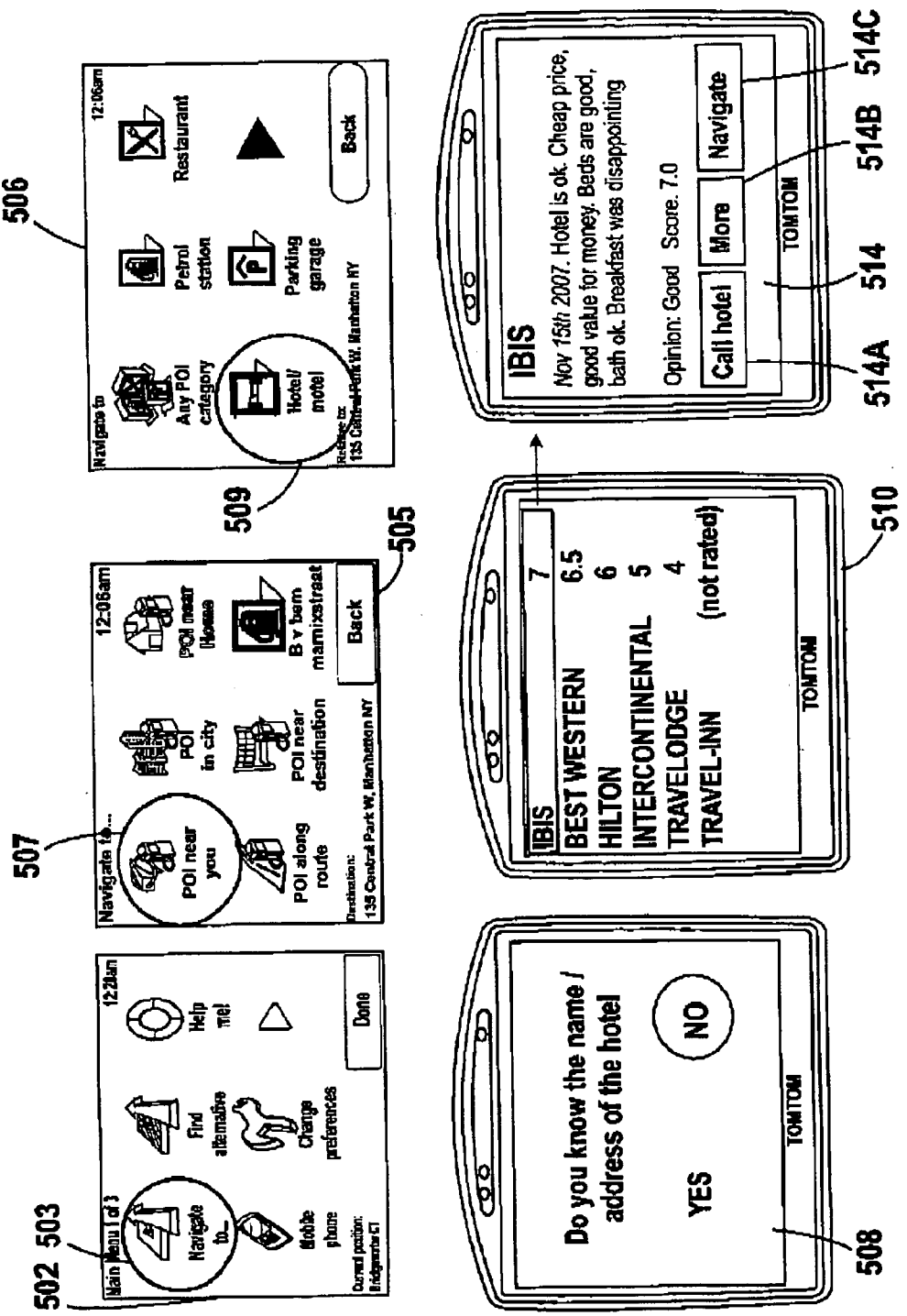
Figure 9:
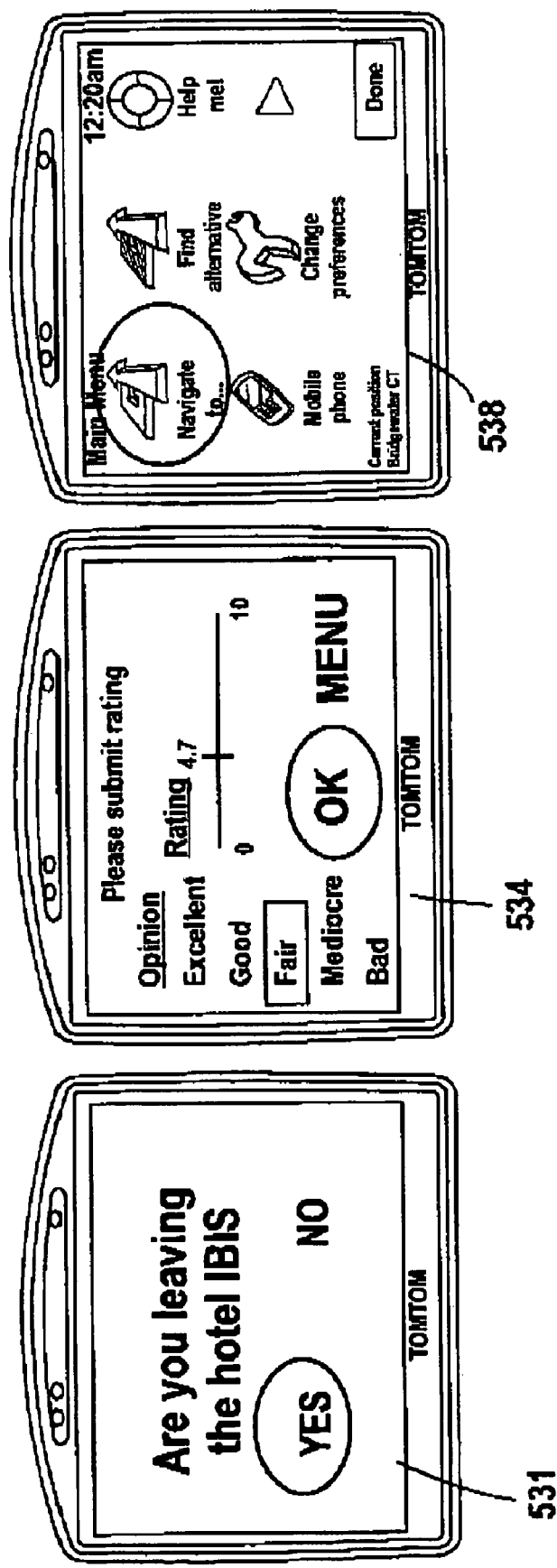
Figure 10:
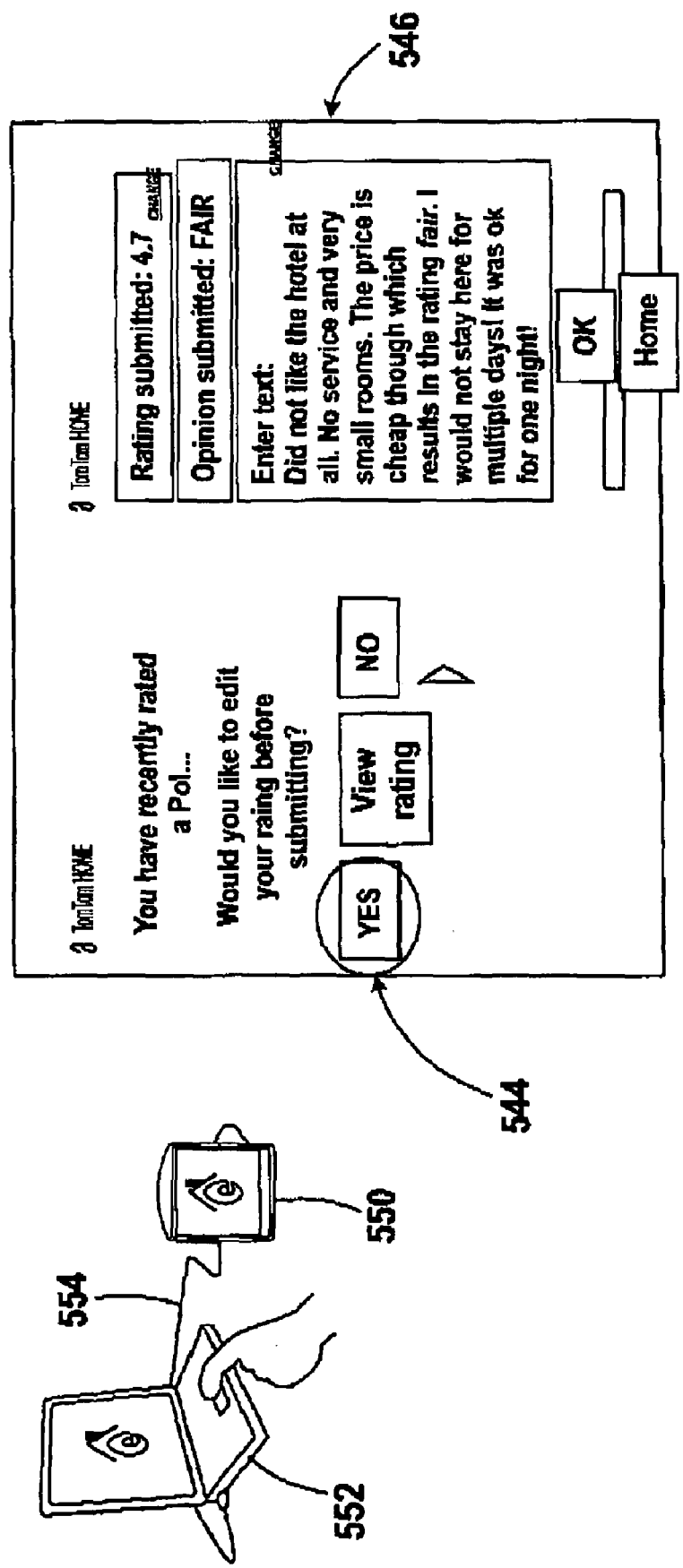

FIGS. 5-7 show basic flow diagrams providing an indication of one possible implementation of the invention, FIG. 8 shows various screenshots from a PND illustrating the manner in which navigation to a POI may be achieved, and how previously entered rating information might be displayed (if available) for the POI chosen, FIG. 9 shows a number of screenshots from a PND illustrating the manner in which qualitative rating information may be entered locally in the device, FIG. 10 shows schematically how previously entered rating information may be edited after connection of the device to a suitable enabled PC.

DETAILED DESCRIPTION OF THE INVENTION

Figure 1:
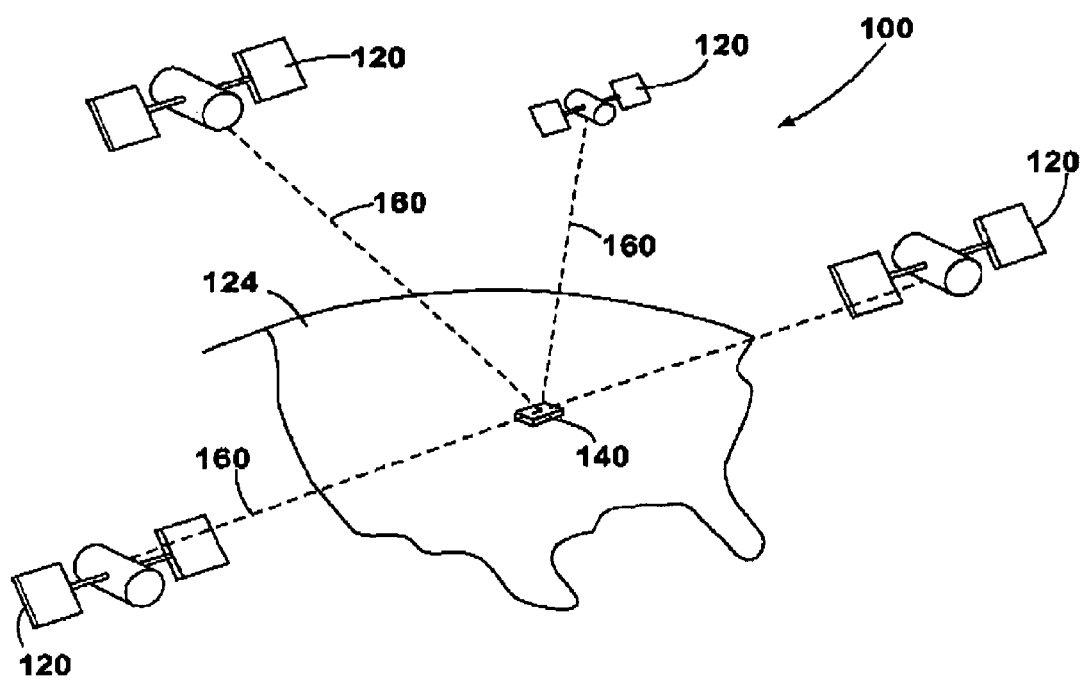
FIG. 1 illustrates an example view of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

Figure 2:
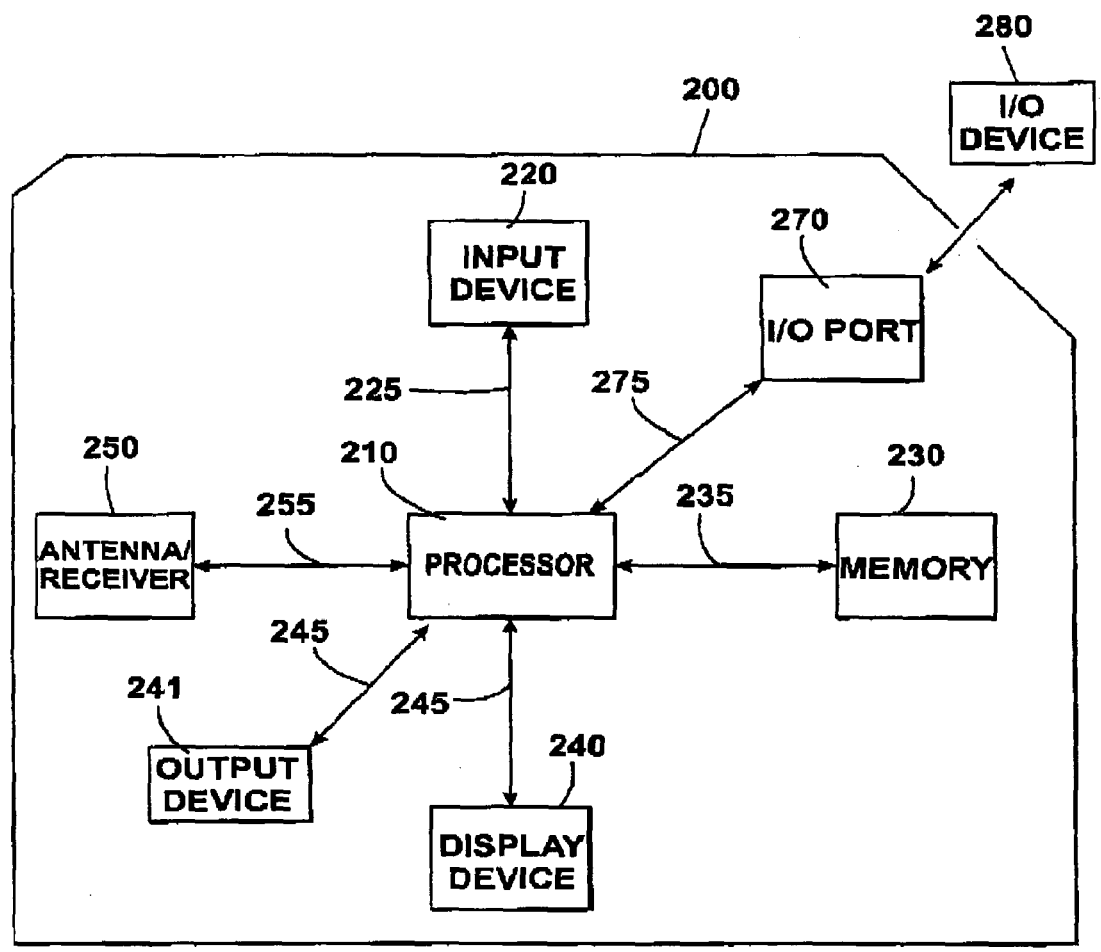
FIG. 2 illustrates an example block diagram of electronic components of a navigation device.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner. FIG. 2 illustrates an example block diagram of electronic components of a navigation device 200, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. The input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 241 can also include, including but not limited to, an audible output device. As output device 241 can produce audible information to a user of the navigation device 200, it is equally understood that input device 240 can also include a microphone and software for receiving input voice commands as well. In the navigation device 200, processor 210 is operatively connected to and set to receive input information from input device 240 via a connection 225, and operatively connected to at least one of display screen 240 and output device 241, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200 may establish a "mobile" or telecommunications network connection with the server 302 via a mobile device (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the internet for example, can be done in a known manner. This can include use of TCP/IP layered protocol for example. The mobile device can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
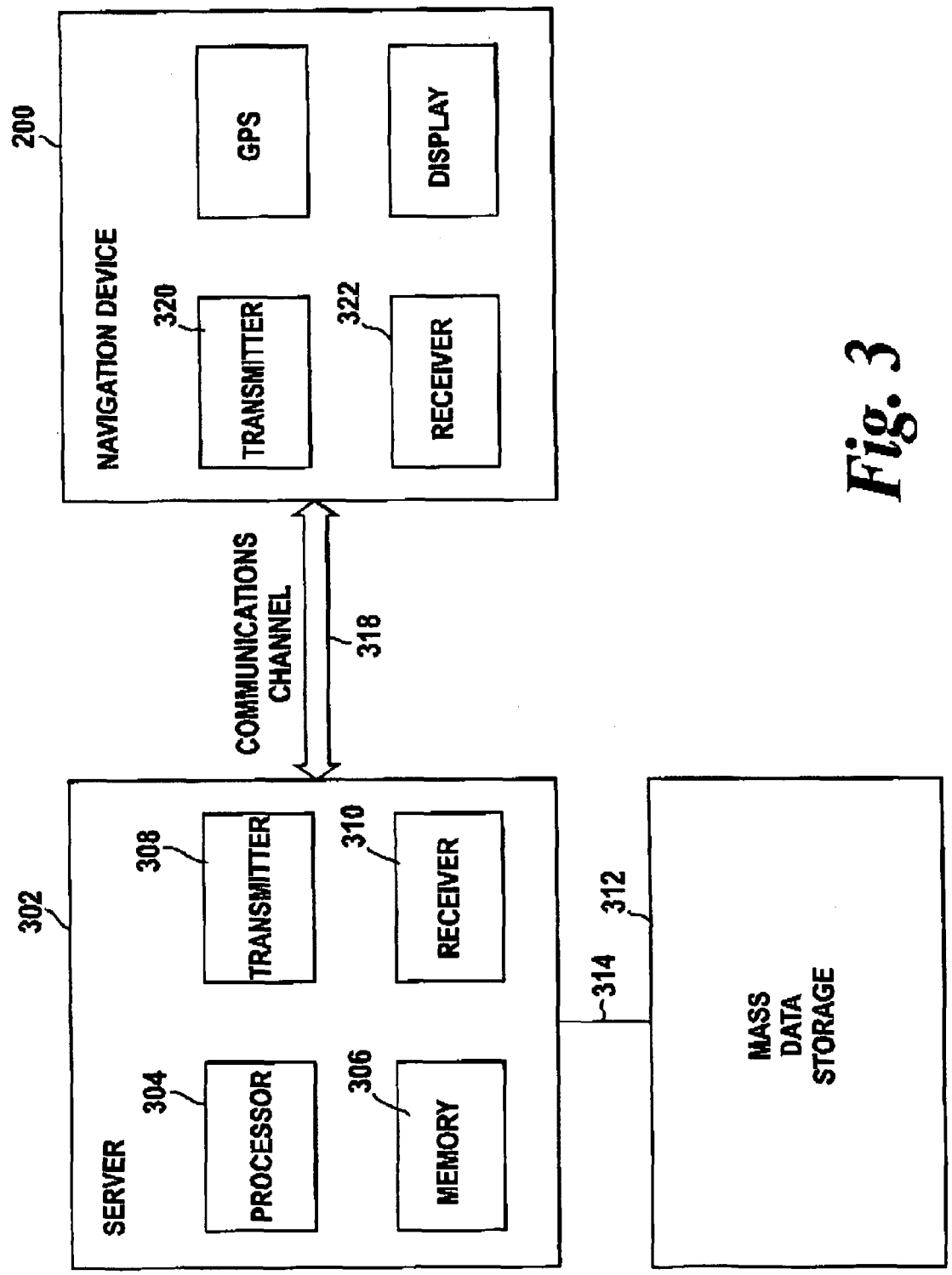
FIG. 3 illustrates an example block diagram of the manner in which a navigation device may receive information over a wireless communication channel.

FIG. 3 illustrates an example block diagram of a server 302 and a navigation device 200 capable of communicating via a generic communications channel 318. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver. Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel. The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, the communication channel 318 can include intermediate devices such as routers, repeaters, buffers, transmitters, and receivers, for example.

For example, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example.

For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
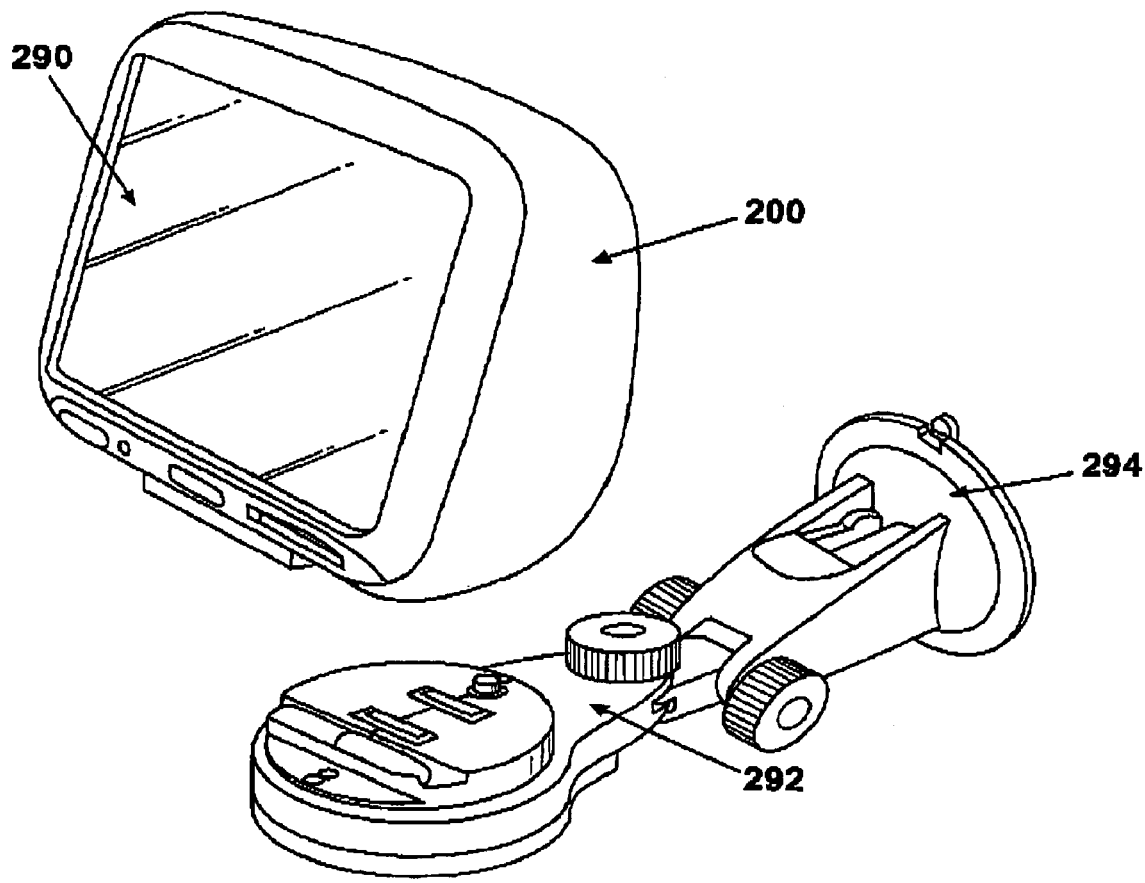
FIGS. 4A and 4B are perspective views of an implementation of an embodiment of the navigation device.
Figure 4B:
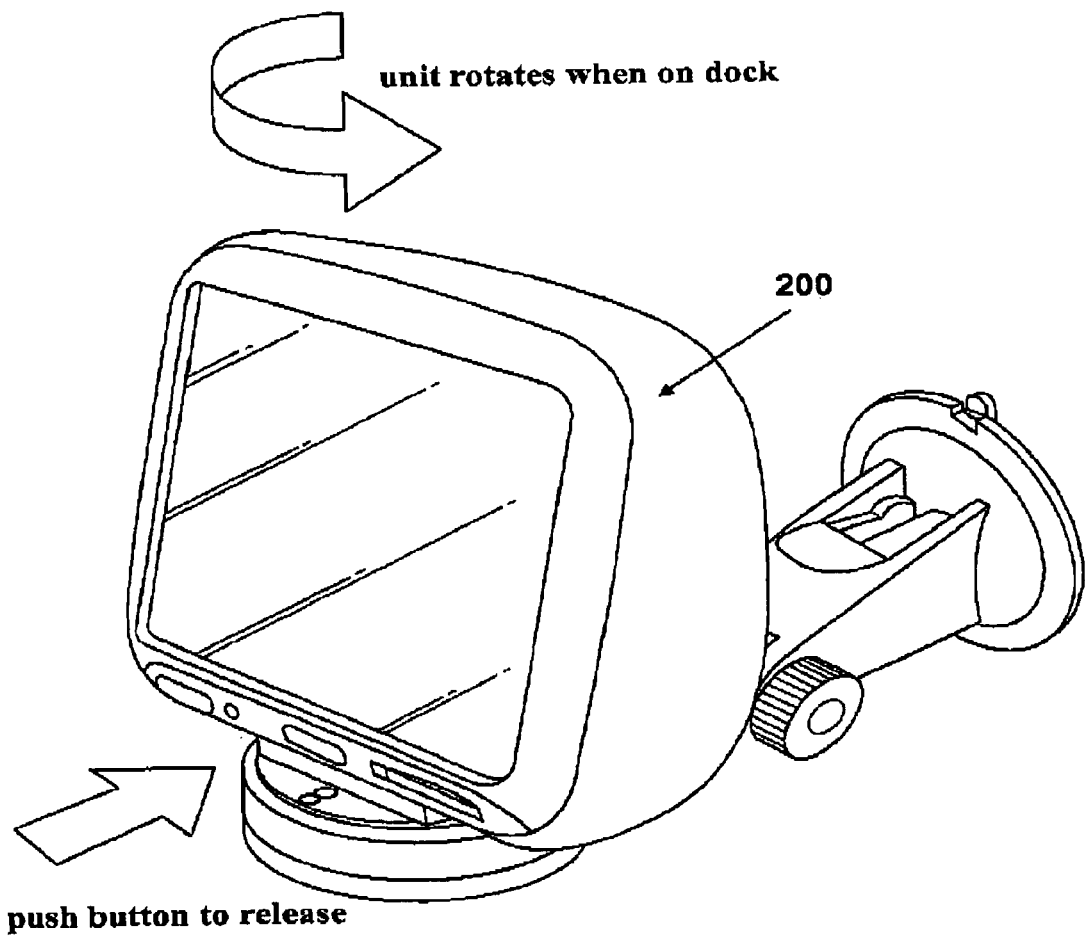

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

Referring to FIGS. 5-7 there is shown a series of schematic flow diagrams indicating how the invention may, in one embodiment, be implemented. In FIG. 5, a destination entry routine is schematically illustrated, wherein the device is turned on at 500, a main menu screen is subsequently presented on the display screen of the device at 502, whereafter, upon selection of the appropriate displayed menu item, a POI menu is displayed at 504 from which a particular type of POI is selected by the user at 506. At this stage in the routine, the user is asked whether he knows the specific name or address of the POI he wishes to navigate to at 508. In the event that no known POI name or address is available, the device presents a list of the particular types of POI earlier selected at 510, ordered according to stored rating information previously entered by the community of device users and having been previously downloaded into the memory of the device, as hereinafter described. At this stage, the user may either select one of the listed POIs at 512, or opt to review more detailed rating and qualitative information at 514, such as the particular rating value, or more detailed audio or textual information, also stored in the device memory, if such has been downloaded or forms part of the body of map information, albeit in a separate file, installed in the device memory. In the embodiment illustrated, the particular POI reviewed and chosen is a hotel, which is ultimately selected by the user at 516, but of course, the invention may apply to any of the various of different types of POI categorized. Examples include, restaurants, parks and other leisure facilities, public houses and bars, theatres and other venues for the performing arts, and the like.

Once the POI is selected as a navigation destination by the user at 516, the device may offer an option to place a telephone call to the chosen POI at 518, again provided that telephone number information is available for that POI and the device is either provided with an integrated mobile telecommunications facility, or is paired with a suitable mobile telephone for such purpose, for example using a short-range wireless communication protocol such as Bluetooth®. Regardless of which this particular option is selected by the user, the device enters a navigation mode at 520 using the previously selected POI and its corresponding egeospatial coordinates identified in map data in the conventional manner.

In the event that the user already knows the name and/or address of the POI it is desired to navigate to, he may indicate this to the device at 508, whereupon the device allows such information to be entered in the device at 522. Of course, although the Figure indicates that such information may be entered physically by typing, commonly using alphanumeric characters displayed on the screen of the device in the form of a virtual keyboard, such information may also be entered verbally if the device is suitably enabled with a microphone and speech processing software. Regardless of how achieved, the entry of this information causes a selection of the POI at 524, whereupon the device may present the option of placing a telephone call thereto as previously described at 518. Finally, navigation may commence at 520.

Referring to FIG. 6, a routine is schematically illustrated whereby a user may enter rating or other qualitative information for a particular POI, location or range of locations possibly forming a route having been navigated by the device and having been found by the user to merit some description, e.g. as a result of having been particularly enjoyable or disagreeable. For instance, as it is usually the case that the device will have been turned off after navigating to a previously entered destination, the software may determine, on start up at 530, on or more of the following:

that the previously entered destination for the previous navigation was a POI the device successfully navigated to that POI, the current position of the device at start up coincides with the previous navigation destination, that is the particular POI, and the time that the device previously completed its navigation, was turned off, and was turned back on again.

From this information it may be presumed by the device that the user has experienced the POI visited, and can therefore form an opinion thereon. Accordingly, the device may present an option at 532 to the user to enter rating or other qualitative information. Thereafter, if chosen, the user is guided through the information entry process by means of one or more data submission screens indicated generally at 534, the data entered at 536 is stored along with an association with the particular POI, location, premises, or range of locations having formed the basis of the previous navigation, and the device operation is returned to normal through display of a main menu at 538. Of course, while the device may preemptively determine that the user has very recently visited a POI or performed a navigation on which qualitative description may be considered useful to the wider community of users, this is not a fundamental requirement of the invention. Indeed, the invention may extend to the entry of qualitative or rating information for any of the POIs identified as part of the map data stored in the device without having previously navigated to such. Furthermore, it is envisaged that particular locations, such as those of scenic beauty or being accident blackspots, or stretches of roads being particularly enjoyable to drive along or being notorious for driving hazards or difficulties, may have ascribed qualitative information thereto.

Referring now to FIG. 7, one possible embodiment for the transmission of stored qualitative and rating information is illustrated. For example, the PND may be physically connected to a user's home PC as indicated at 540 by means of a USB cable. The PC will typically have installed thereon a suitable application, such the TomTom HOME™ software available from the applicant herefor. This software provides a variety of different functions, such as facilitating the transfer of information between the PND and the PC, which is desirably connected to the internet. In this manner, map data update files, POI update files, speed camera update files, and updates to the device core navigation application software may be uploaded. Additionally, previously installed add-on features, including any of the above, may be removed from the native device memory.

Accordingly, once a connection is recognized by the PC software at 542, the user is presented with an on-screen (PC) option at 544 to edit the previously locally entered qualitative information, which may be quite limited on account of the relative difficulty of entering lengthy textual descriptions using the touch-sensitive screen and displayed on-screen keyboard commonly provided in software routines provided on the device. If such option is selected, the PC-user can use the local PC keyboard (and possibly other locally connected peripherals) to edit the rating and descriptive text as at 546 before any upload of information occurs at 548.

In this manner, user-originated qualitative information, including any audio and textual descriptive information, may simply be transferred from the device to the PC, and ultimately forwarded, over the internet connection, to a back-end processing, validation and/or collation facility so that such information may be uniformly re-packaged for subsequent distribution to the entire community of device users.

Referring to FIG. 8, which provides example screenshots for the certain aspects of the process illustrated in FIG. 5 and uses corresponding reference numerals where appropriate, a main navigation menu is displayed at 502 from which a "navigate to . . . " icon 503 is selected by a user. A subsequent screen 505 is then displayed from which a selection is made to navigate to a POI proximate the present location, indicated by circled icon 507. Thereupon, a further screen is displayed which allows a selection of particular type of POI, 506, and a circled "Hotel/Motel" icon 509 indicates user selection thereof.

The option screen 508 is then displayed, and on selection of the "no" option circled in the figure, the device effects processing of the various ratings applied to POIs of that type in the designated area, as shown at 510. Of course, there may be no rated POIs of that type in the designated area, in which case a usual list is displayed without rating information. Selection of one of the entries in the list causes display of more detailed information at 514, which includes further selectable options 514A, 514B, 514C, which respectively provide a means of placing a telephone call to the selected POI (518 in FIG. 5), displaying yet further detailed information, and commencing a navigation to the POI from the current location (520 in FIG. 5).

In FIG. 9, example screenshots are provided by means of which the entry of qualitative and rating information may be entered locally in the device, exemplifying the routine illustrated in FIG. 6. For instance, after a navigation to the POI selected in FIG. 8 is performed, the device is capable of recognizing that it has been switched off or stationary within a predetermined distance of the relevant POI for a predetermined period of time. Once the device is switched on, brought out of a standby mode, or otherwise reactivated after this time period, a screen such as that shown at 531 is displayed affording the user an opportunity of indicating to the device that departure from the previously identified POI is imminent. Selection of a positive indication of this fact results in the display of a rating and qualitative information entry screen 534—it will be seen in this screen that basic information can be entered very quickly. Thereafter, the device returns to the display of the main menu.

Finally, referring to FIG. 10, which provides PC-based a schematic diagram and screenshots exemplifying the routine illustrated in FIG. 7, a PND 550 is connected to a laptop or personal computer 552 by means of a USB cable. Of course, connection between such devices may be made wirelessly if both apparatus are suitably enabled. From within the computer-installed software application, which recognizes the connection of the device, the user is prompted in screen 544 to edit and add to previously device-locally entered rating and other qualitative information in screen 546.

What is claimed is:

1. A method of operating a portable navigation device or navigation system by a user, said device or system comprising a memory, user interface and locally stored map data, said method comprising the steps of:

storing into memory a specific Point of Interest, other location or location range, said Point of Interest, location or range being identifiable with reference to said map data and optionally being or including a current location of said device or system;

presenting to said user at least one user-selectable option via said user interface, said option arranged such that qualitative information pertaining to the said Point of Interest, other location or location range can be entered into said memory;

recording and storing qualitative information and association of said information with said identified Point of Interest, other location or location range into said memory as primary information, said step of recording and storing executed by said device or system subsequent to selection of said option; and transmitting said primary information to a remote device wherein the at least one user-selectable option is presented to the user by the device or system subsequent to a determination thereby that the said Point of Interest, other location or location range has formed the basis of a previous navigation.

2. The method according to claim 1, wherein said step of transmitting further comprises the step of wirelessly transmitting said primary information.

3. The method according to claim 1, wherein said primary information is stored in said memory for later transmission to said remote device.

4. The method according to claim 1, wherein said qualitative information further comprises at least an indication of said user's subjective opinion of said Point of Interest, location or range of locations.

5. The method according to claim 1, wherein said qualitative information comprises a user rating based on a predetermined, locally stored scale.

6. The method according to claim 1, wherein said qualitative information comprises at least one of: alphanumeric data and digitized audio data, wherein said user interface further comprises a touch screen arranged to receive entry of said alphanumeric data and a microphone arranged to receive entry of said digitized audio data.

7. The method according to claim 1, further comprising the steps of:

presenting another option to said user to record secondary descriptive information, said secondary descriptive information being both at least temporarily associated with and stored with one of said Point of Interest, location or range and the primary information; and transmitting said secondary descriptive information to said remote device.

8. The method according to claim 6, further comprising the step of:

presenting a further option to said user to enter an audio recording mode;

activating said microphone in response to selection of said further option;

digitizing audio signals received by said microphone; and storing said audio signals into a digital audio file in said memory.

9. The method of claim 8, wherein said step of digitizing further comprising the step of associating said digital audio file with at least one of: said primary information and said Point of Interest, location or range.

10. The method according to claim 1, further comprising the step of presenting another option to said user which when selected causes said device or system to enter an alphanumeric character entry mode in which a virtual keyboard is displayed on a display screen of said device or system, and a text file is simultaneously or subsequently created in memory which captures alphanumeric characters entered by said user via said virtual keyboard.

11. The method according to claim 10, further comprising the step of associating said text file with at least one of primary information and Point of Interest, location and range during or after creation of said text file.

12. The method according to claim 11, wherein said step of presenting to said user is triggered after said user has entered one of said Point of Interest, location or range as a navigation destination and said device or system determines that a navigation thereto has been completed.

13. The method according to claim 12, wherein said step of presenting to said user at least one user-selectable option by means of which qualitative information can be stored occurs after said device or system determines that said user is departing from a Point of Interest, location, or range previously entered as a desired destination to which a navigation has occurred.

14. A portable navigation device or navigation system, comprising:
   GPS signal reception means;
   processing means;
   memory;
   display;
   means for identifying at least one of a specific Point of Interest, other location or location range optionally being or including a current location with reference to map data locally stored in said memory;
   means for at least temporarily storing in said memory, separately from said map data, at least one of said specific Point of interest, other location or location range;
   means for displaying information by means of which a qualitative description pertaining to the said Point of Interest, other location or location range can be entered locally and stored, said qualitative description being associated with said identified Point of Interest, other location or location range, such together forming primary information; and
   means for subsequently transmitting said primary information to a remote device wherein the displayed information is presented to the user by the device or system subsequent to a determination thereby that the said Point of Interest, other location or location range has formed the basis of a previous navigation.

* * * * *